(12) United States Patent
Pedraza et al.

(10) Patent No.: US 7,324,827 B2
(45) Date of Patent: Jan. 29, 2008

(54) METHOD AND SYSTEM FOR HARMONIZING AN OPERATION AREA FOR A MOBILE DEVICE IN A CELLULAR RADIO NETWORK

(75) Inventors: Salvador Pedraza, Malaga (ES); Matias Toril, Malaga (ES)

(73) Assignee: Nokia Corporation, Espoo (FI)

( * ) Notice: Subject to any disclaimer, the term of this patent is extended or adjusted under 35 U.S.C. 154(b) by 517 days.

(21) Appl. No.: 10/398,413

(22) PCT Filed: Oct. 18, 2001

(86) PCT No.: PCT/EP01/12086

§ 371 (c)(1), (2), (4) Date: Jul. 8, 2003

(87) PCT Pub. No.: WO03/037020

PCT Pub. Date: May 1, 2003

(65) Prior Publication Data

US 2004/0033800 A1 Feb. 19, 2004

(51) Int. Cl.
  *H04Q 7/20* (2006.01)
(52) U.S. Cl. .................. 455/522; 455/455; 455/429
(58) Field of Classification Search ........ 455/436–444, 455/69, 522, 429, 67.11, 513, 115.3, 134, 455/161.3, 226.2, 33.2, 432.1, 432, 421, 455/422.1, 33.1, 33.4, 422.429; 370/331, 370/318
See application file for complete search history.

(56) References Cited

U.S. PATENT DOCUMENTS 6,985,736 B1 * 1/2006 Aalto .......................... 455/447

7,023,822 B1 * 4/2006 Czaja et al. ................. 370/332

FOREIGN PATENT DOCUMENTS

EP  1 049 349  11/2000

(Continued)

OTHER PUBLICATIONS

Wolf R. Mende, "Evaluation of a Proposed Handover Algorithm for the GSM Cellular System", Vehicular Technology Conference, Orlando, May 6-9, 1990, New York, IEEE, US, vol. Conf. 40, May 6, 1990, pp. 264-269, XP000203819.

(Continued)

*Primary Examiner*—Tu Nguyen
(74) *Attorney, Agent, or Firm*—Squire, Sanders & Dempsey L.L.P.

(57) ABSTRACT

The invention relates to a method and a system for harmonising an operational area for a mobile device on a cell-by-cell-basis in a cellular radio network, like a GSM network, wherein, in idle mode, the mobile device compares field strength levels of different base stations with each other in order to set up a power budget, and selects the most appropriate base station in accordance with said power budget, wherein for prioritizing a predetermined base station an individual additional offset term is applied in the power budget. The invention is characterized in that in connection mode, the mobile device compares the power received from different base stations with each other in order to set up a power budget, and selects the most appropriate base station in accordance with said power budget, wherein for prioritizing a predetermined base station an individual additional offset term is applied in the power budget, and both offset terms are set so as to be similar to each other or the same.

23 Claims, 2 Drawing Sheets

FOREIGN PATENT DOCUMENTS

| | | |
|---|---|---|
| WO | 93/12623 | 6/1993 |
| WO | 00/38463 | 6/2000 |

OTHER PUBLICATIONS

C. Chandra, et al., "Determination of Optimal Handover Boundaries in a Cellular Network Based on Traffic Distribution Analysis of Mobile Measurement Report", 1997 IEEE 47th Vehicuar Technology Conference, Phoenix, May 4-7, 1997, IEEE Vehicular Technology Conference, New Your, IEEE, US, vol. 1 CONF. 47, May 4, 1997, pp. 305-309, XP000701809.

* cited by examiner

Directional resizing in connected mode

Non-directional resizing in idle mode

METHOD AND SYSTEM FOR HARMONIZING AN OPERATION AREA FOR A MOBILE DEVICE IN A CELLULAR RADIO NETWORK

FIELD OF THE INVENTION

The present invention relates to a method and system for harmonizing an operational area for a mobile device on a cell-by-cell-basis in a cellular radio network, like a GSM (Global System of Mobile communication) network.

BACKGROUND OF THE INVENTION

In current systems, the flexibility resulting from the existing large set of parameters included in the different algorithms cannot be fully used because of its complexity. In the planning stage, homogeneous networks are normally considered, as the large set of parameter makes the detailed planning process on a cell-by-cell basis a time-consuming task. As a consequence, the operators fix parameters to a common set of default values shared between cells, even if no optimum performance in terms of quality/capacity is reached. This homogeneity hypothesis may be far from reality, where interference or propagation severity can vary both in time and space over the network.

Moreover, a few operators extend the parameter optimisation by classifying the cells in accordance with certain scenarios like rural, urban, tunnel, indoors etc. and/or in accordance with the layer/band used (like Macro900/1800, Micro900/1800, Pico1800, Motorway900). So, the cells are divided into scenario groups or layer/band groups, and common default parameter values are shared which, however, are not optimum.

In those cases where new features are enabled, so-called field trials are required. During the tuning process, conclusions from parameter changes are difficult to derive, and final settings are nearly always on the safe side with its limited results. Moreover, such trials are normally focused on global parameters of features under study, and parameter optimisation of adjacent cells is hardly ever done. So, differences between adjacent cells are rarely considered due to a high effort required. Therefore, the potential of so-called adjacency parameters is not fully exploited.

A final limited parameter tuning based on cell/area level performance indicators is normally carried out only over those cells where performance problems are existing.

Even if an optimum value were reached by means of the above-mentioned trials, changes in traffic or environment conditions, like the installation of new cells, changes of interference level by frequency re-planning etc., would force a further re-tuning process of the parameter base, where no automatic reactive process is currently in use. Such a situation could be analysed as a result of slow trends, like the change of the number of user registrations, or fast changes, e.g. of the number of connections, during a short time period, like an hour or a day.

The obvious conclusion is the inability to grasp the full flexibility of the wide set of parameters.

In particular, parameters defining the cell operational area during the idle (camping) mode and the connection mode are not synchronised. In fact, cell attractiveness during connection mode may be completely different from idle mode due to traffic management strategies, causing unnecessary flow of users. The final result will be waste of bandwith in signalling and risk of dropped calls during the handover process.

From this analysis, it is obvious that unnecessary handover may be avoided if users camp on the cell which they are more likely to end-up in. Doing so, a great potential performance gain may be achieved. Moreover, operators may benefit from an automatic individual (i.e. cell based) optimising and tuning process. This would help operators in the tuning process and offer cost savings and improved performance, despite network inhomogeneities both in space (i.e. cell) and time (e.g. day or hour).

SUMMARY OF THE INVENTION

It is an object of the present invention to propose a method and a system providing an automatic tuning process for harmonizing the operational area in every mode on a cell-by-cell-basis.

In order to achieve above and further objects, according to a first aspect of the present invention, there is provided a method for harmonising an operational area for a mobile device on a cell-by-cell-basis in a cellular radio network, like a GSM network, wherein, in idle mode, the mobile device compares field strength levels of different base stations with each other in order to set up a power budget, and selects the most appropriate base station in accordance with said power budget, wherein for prioritizing a predetermined base station an individual additional offset term is applied in the power budget;

characterized in that, in connection mode, the mobile device compares the power received from different base stations with each other in order to set up a power budget, and selects the most appropriate base station in accordance with said power budget, wherein for prioritizing a predetermined base station an individual additional offset term is applied in the power budget, and both offset terms are set so as to be similar to each other or the same.

According to a second aspect of the present invention, there is provided a system for harmonising an operational area for a mobile device on a cell-by-cell-basis in a cellular radio network, like a GSM network, comprising idle mode means for comparing field strength levels of different base stations with each other in order to set up a power budget and selecting the most appropriate base station for a mobile device in accordance with said power budget, wherein for prioritizing a predetermined base station an individual additional offset term is applied in the power budget;

characterized by, connection mode means for comparing the power received from different base stations with each other in order to set up a power budget and selecting the most appropriate base station for the mobile device in accordance with said power budget, wherein for prioritizing a predetermined base station an individual additional offset term is applied in the power budget, and both offset terms are set so as to be similar to each other or the same.

The mobile device in idle mode compares field strength levels coming from different cells with each other and selects the best one from them. In this power budget, an individual additional offset may be applied if one cell must be prioritised for artificially increasing its attractiveness.

In dedicated or connection mode, the mechanism which assures that the mobile device is always within the cell offering the best coverage is assured by handover mechanisms. Similar to idle mode case, in accordance with the present invention, received power is compared and the best base station is chosen through power budget. Priority biasing may as well be applied to (un)favour users into one specific cell by means of margins, which may be the case for reactive load balancing mechanisms.

In accordance with the present invention, both offset terms are similar to each other or the same, in order to maintain a coherent power budget evaluation in order to prioritise cells.

Preferably, the offset terms are so-called biasing margin terms.

Usually, idle mode parameters relate to the size of cells of adjacent base stations, wherein the idle mode parameters may affect to the size of cells of adjacent base stations in a non-directional way. In contrast thereto, connection mode parameters may take into account differences between cells of adjacent base stations.

The main difficulty may reside in the above mentioned fact that parameters related to idle mode or user camping behaviour are cell-specific, whereas parameters related to connection mode or handover mechanisms may be adjacency-specific. So, some sort of average process of the operational area in handovers may be needed in order to draw a global conclusion for cell selection/reselection parameters. Once this average margin term in handovers for a cell with its adjacencies has been reckoned, the biasing term for idle mode will be set equal in accordance with the present invention. Further considerations related to adjacencies strengths (e.g. handover share from specific adjacency) may as well be accounted for through weighting operations in such averaging process.

The power budget $PBGT_{serv}(adj)$ is calculated by using the equation $$PBGT_{serv}(adj) = RxLev_{adj} - RxLev_{serv} - HoMarginPBGT_{serv}(adj),$$

where $RxLev_{adj}$ is the received downlink level from an adjacent base station, $RxLev_{serv}$ is the received downlink level from the currently serving base station, and $HoMarginPBGT_{serv}(adj)$ is a handover margin power budget parameter to artificially change priority of the adjacent base station for handover from the serving base station; and the handover margin power budget parameter may be averaged by using the equation $$\overline{HoMarginPBGT_{adj}}[dB] = \frac{HoMarginPBGT_{serv}(adj) + HoMarginPBGT_{adj}(serv)}{2}$$

where $HoMarginPBGT_{adj}(serv)$ is a handover margin power budget parameter to artificially change priority of the currently serving base station for handover from the adjacent base station.

The priority difference $AdjPriorDifference_{adj}$ [dB] between the cell of the currently serving base station and the cell of an adjacent base station may be calculated by using the equation $$AdjPriorDifference_{adj}[dB] = \\ (HoMarginPBGT_{serv}(adj) - \overline{HoMarginPBGT}) = \\ (HoMarginPBGT_{adj}(serv) - \overline{HoMarginPBGT}).$$

In a preferred embodiment wherein in connection mode for prioritizing a plurality of base stations a corresponding plurality of individual additional offset terms are provided, the offset terms are averaged so as to create an averaged offset term.

Preferably, the averaged offset term X is calculated by using the equation $$X = \underset{adj}{Average}\left[\left(\frac{Incom + Outg.HOTraffic_{adj \leftrightarrow serv}}{\sum_{adj} Incom + Outg.HOTraffic_{adj \leftrightarrow serv}}\right) \cdot AdjPriorDifference_{adj}\right],$$

where $Incom+Outg.HOTraffic_{adj \leftrightarrow serv}$ reflects the sum of incoming and outgoing handovers between adjacent and serving cell.

Moreover, a presently preferred embodiment of the invention, wherein in idle mode a basis C2 cell reselection is calculated by using the equation $$C2_{serv} = (RxLev_{serv} - RxLevAccesMin_{serv}) + CellReselectOffset_{serv}$$

where $RxLev_{serv}$ is the received downlink level from the currently serving base station, $RxLevelAccessMin_{serv}$ is the minimum downlink level threshold received by the mobile device to camp in a cell, and $CellReselectOffset_{serv}$ is the biasing term to artificially change the priority of the currently serving base station, is characterized in that if the averaged offset term is positive, it is taken as the parameter $CellReselectOffset_{serv}$.

So, in accordance with the present invention, differences in operational areas between idle and connected modes that produce inefficient flow of users are essentially overcome.

A further advantage of the present invention is that traffic and environment changes are tracked by means of automatic parameter auto-tuning in order to achieve the best performance without user interaction. As a consequence, less parameters are required to be adjusted. Further, unnecessary flow of user between cells is avoided resulting in saving bandwidth in terms of signalling and achieving a better efficiency. Moreover, the present invention provides for a better performance since unnecessary handovers are reduced and every handover means a risk for a dropped call. Finally, a fast optimisation capability is achieved by the present invention since automatic (i.e. non-user) control enables the network for fast auto-tuning algorithms, whenever agile changes are allowed.

The present invention can be implemented in any kind of cellular mobile network systems like e.g. GSM or UMTS (Universal mobile telecommunications system).

BRIEF DESCRIPTION OF THE DRAWINGS

In the following, the present invention will be described in greater detail based on a preferred embodiment with reference to the accompanying drawings wherein.

DESCRIPTION OF THE PREFERRED EMBODIMENTS

Figure 1:
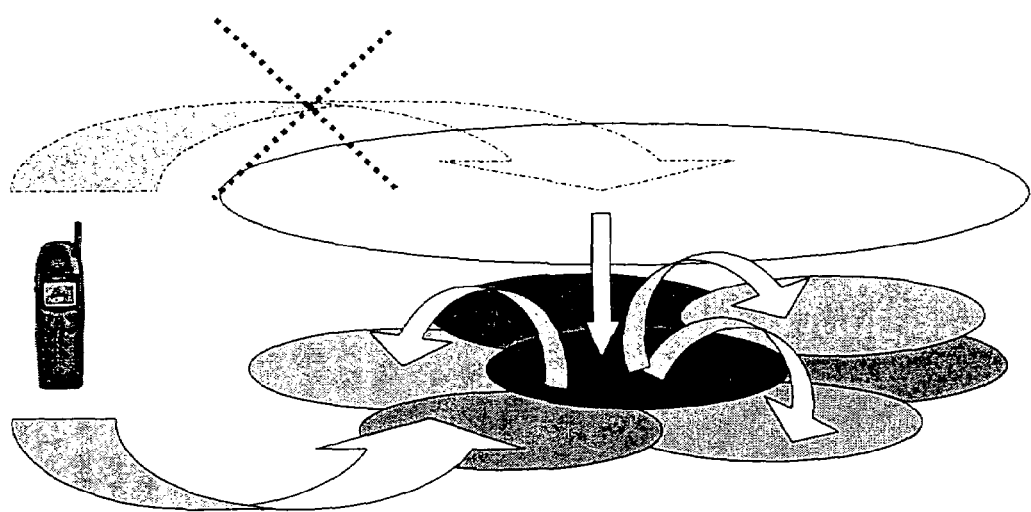
FIG. 1 shows unnecessary flow of users.

FIG. 1 shows an unnecessary flow of users, which may be prevented. A camped cell may differ from the final target cell, due to the fact that idle mode and connected mode traffic management strategies (defined by their parameters) may be quite different.

So, a search for common metrics to prioritise cells, regardless the stage of the relationship between the user and the network, defines the key process.

In GSM systems, C1 and C2 comparisons are the basic metrics used for the prioritisation of cells in idle mode, where the cell with a higher value will finally be chosen. Basic C2 cell reselection is calculated by equation:

$$C2_{serv} = (RxLev_{serv} - RxLevAccesMin_{serv}) + CellReselectOffset_{serv} \quad (1)$$

where $RxLev_{serv}$ is the received downlink level from beacon frequency of the currently serving base station, $RxLevelAccessMin_{serv}$ is the minimum downlink level threshold received by the mobile device to camp in a cell, and $CellReselectOffset_{serv}$ is the biasing term to artificially change the priority of the currently serving base station.

In connected mode, power budget equation is the metric used by the network algorithm to protease cells in the target cell evaluation mechanism. Power budget follows the equation:

$$PBGT_{serv}(adj) = RxLev_{adj} - RxLev_{serv} - HoMarginPBGT_{serv}(adj), \quad (2)$$

where $RxLeV_{adj/serv}$ is the received downlink level from adjacent/serving cell beacon frequency, and $HoMarginPBGT_{serv}(adj)$ is the handover margin power budget parameter term to artificially change cell priority of adjacent cell.

Figure 2:
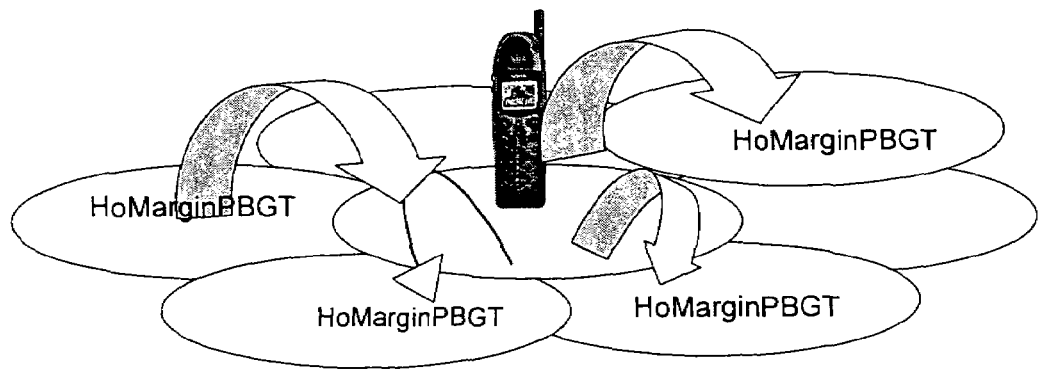
FIG. 2 shows traffic management in connected mode through power budget margins.

Multiple objectives can be achieved with the last handover margin power budget term. First, certain hysteresis degree is assured by means of symmetrical values so that instabilities in the form of the so-called ping-pong handovers are prevented. Second, traffic management strategies are normally based on the asymmetrical modification of this margin term, as it is shown in FIG. 2. This figure shows how sign and magnitude of margins (un)constrain the flow of users in different directions, thus affecting operation areas in a directional way. Aligned to this idea, congestion relief (or load balancing) algorithms benefit from the instantaneous ability to modify margins, temporarily (un)constraining the flow of users between cells.

Due to the fact that margins must ensure hysteresis, margins will not be zero, even when no biasing is applied. This observation shows that the margin term will include a symmetrical component for hysteresis and asymmetrical component in order to re-direct traffic. This last term will show the biasing into any direction.

It is important to note that CellReselectOffset as given in the above equation (1) is a cell parameter, thus affecting adjacencies in a non-directional way. On the other side, $HoMarginPBGT_{serv}(adj)$ as given in the above equation (2) is an adjacent cell parameter, which enables it to have influence not only on the size, but also on the shape of the cell. In other words, idle mode parameters affect the size of adjacencies in a non-directional way, while handover algorithms may take into account differences between adjacencies.

Figure 3:
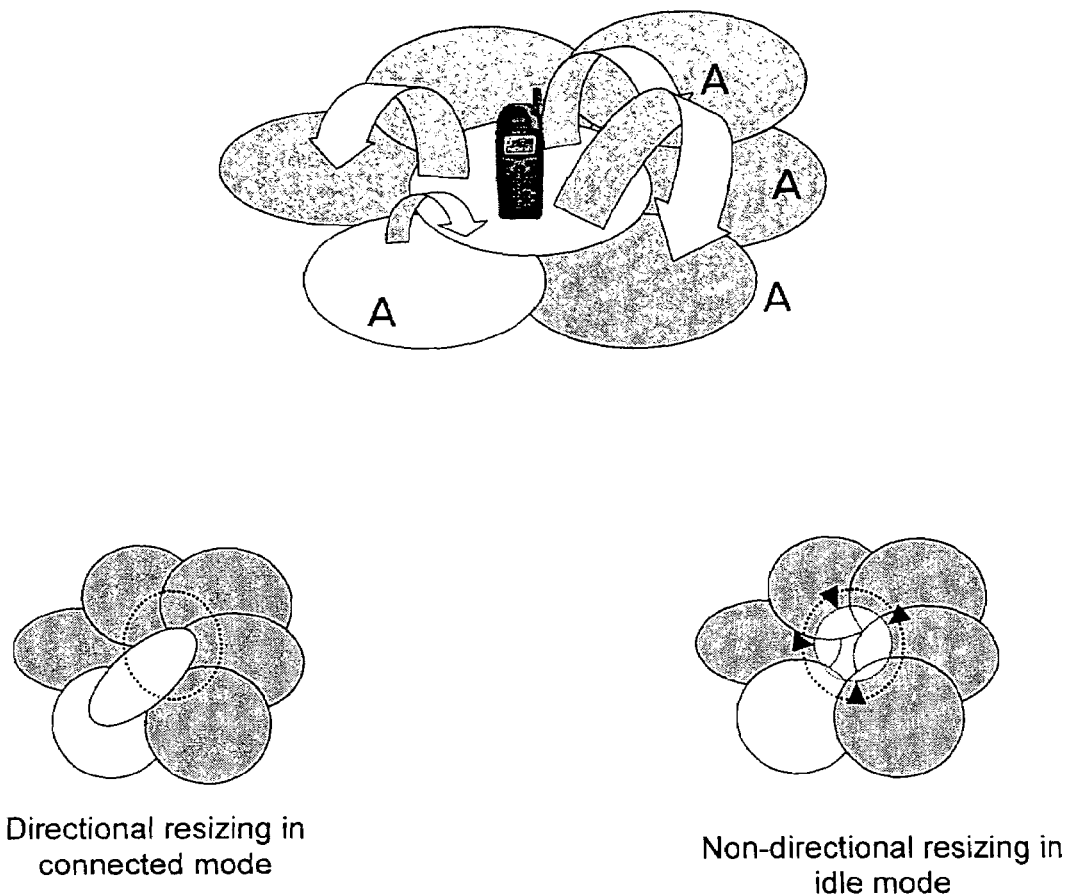
FIG. 3 shows idle mode and connected mode parameter influences on cell size and shape.

This idea is presented in FIG. 3, where different shape and size is obtained, depending on the selection of the parameters, which are tuned. In particular, this figure shows that adjacent cell parameters in connected mode define the shape of the cell through different prioritisation biasing and that cell parameters affect adjacency operational area in a global way. Based on this fact, some sort of average process of the operational area in handovers is needed in order to draw a global conclusion for cell reselection parameters. Unless margins are the same for every adjacency, operational areas will not perfectly match: minimum error between operational areas is the final target.

The automatic tuning process in charge of the CellReselectOffset parameter tuning will run the following sequence of operations on a cell individual basis:

1. For every adjacency, the symmetrical component of the margin must be cancelled in order to calculate the deviation from the situation where just raw power is the final target. Thus, the first step will try to reckon the centre of the hysteresis region.

For this purpose, the handover margin power budget parameter is averaged by using the equation $$\overline{HoMarginPBGT_{adj}}[dB] = \frac{HoMarginPBGT_{serv}(adj) + HoMarginPBGT_{adj}(serv)}{2} \quad (3)$$

where $HoMarginPBGT_{adj}(serv)$ is a handover margin power budget parameter to artificially change priority of the currently serving base station.

So, the process depicted in formula 1 maps two values (incoming and outgoing direction of the adjacency) into a unique value for the centre, assigned for the whole adjacency.

2. Once centre hysteresis point has been defined, the deviation from symmetrical situation Adj Prior Difference may easily be calculated from the equation $$AdjPriorDifference_{adj}[dB] = \quad (4)$$
$$(HoMarginPBGT_{serv}(adj) - \overline{HoMarginPBGT}) =$$
$$(HoMarginPBGT_{adj}(serv) - \overline{HoMarginPBGT})$$

The obtained result shows the asymmetrical component of the margins, averaging both directions of the adjacency (i.e. incoming and outgoing handovers).

3. As stated before, connected mode parameters may modify the cell area in a non-directional way. So, an averaging process is needed so that a final conclusion must be extracted from the set of adjacencies. Those adjacencies with a higher number of handovers must be weighted favourably so that the cell size is adapted to the real operational area. This averaging process is seen by the equation $$CellReselectOffset_{serv}[dB] = \qquad (5)$$

$$\underset{adj}{Average}\left[\left(\frac{Incom + Outg.HOTraffic_{adj \leftrightarrow serv}}{\sum_{adj} Incom + Outg.HOTraffic_{adj \leftrightarrow serv}}\right) \cdot AdjPriorDifference_{adj}\right].$$

where Incom+Outg.HOTraffic$_{adj \leftrightarrows cell}$ reflects the sum of incoming and outgoing handovers between adjacent and serving cells.

Finally, priority bias is forced positive, i.e.

$$CellReselectOffset_{serv}[dB]= Max(CellReselectOffset, 0) \qquad (6)$$

as it is a constraint for the CellReselectOffset parameter. When a cell is user receptor, the value must be positive. On the contrary, if a cell is refusing users, any adjacency will tend to show a high priority positive bias (averaged with their own whole set of adjacencies). In this way, double counting is prevented Although the invention is described above with reference to an example shown in the attached drawings, it is apparent that the invention is not restricted to it, but can vary in many ways within the scope disclosed in the attached claims.

The invention claimed is:

1. A method, comprising:
in idle mode, comparing, by a mobile device, field strength levels of different base stations with each other in order to set up a power budget, and selecting the most appropriate base station in accordance with said power budget, wherein for prioritizing a predetermined base station an individual additional offset term is applied in the power budget, the method being for harmonizing an operational area for a mobile device on a cell-by-cell-basis in a cellular radio network; and
in connection mode, comparing, by the mobile device, the power received from different base stations with each other in order to set up a power budget, and selecting the most appropriate base station in accordance with said power budget, wherein for prioritizing a predetermined base station an individual additional offset term is applied in the power budget,
wherein both offset terms are set so as to be similar to each other or the same.

2. The method according to claim 1, wherein idle mode parameters relate to the size of cells of adjacent base stations.

3. The method according to claim 2, wherein the idle mode parameters affect to the size of cells of adjacent base stations in a non-directional way.

4. The method according to claim 1, wherein connection mode parameters take into account differences between cells of adjacent base stations.

5. The method according to claim 1, wherein said offset terms are biasing margin terms.

6. The method according to claim 5,
wherein the power budget PBGT$_{serv}$(adj) is calculated by using the equation $$PBGT_{serv}(adj)=RxLev_{adj}-RxLev_{serv}-HoMarginPBGT_{serv}(adj),$$

where RxLev$_{adj}$ is the received downlink level from an adjacent base station, RxLev$_{serv}$ is the received downlink level from the currently serving base station, and HoMarginPBGT$_{serv}$(adj) is a handover margin power budget parameter to artificially change priority of the adjacent base station for handover from the serving base station;
characterized in that
the handover margin power budget parameter is averaged by using the equation $$\overline{HoMarginPBGT}_{adj}[dB] = \frac{HoMarginPBGT_{serv}(adj) + HoMarginPBGT_{adj}(serv)}{2}$$

where HoMarginPBGT$_{adj}$(serv) is a handover margin power budget parameter to artificially change priority of the currently serving base station.

7. The method according to claim 6, characterized in that the priority difference Adj PriorDifference$_{adj}$ between the cell of the currently serving base station and the cell of an adjacent base station is calculated by using the equation $$AdjPriorDifference_{adj}[dB] =$$
$$(HoMarginPBGT_{serv}(adj) - \overline{HoMarginPBGT}) =$$
$$(HoMarginPBGT_{adj}(serv) - \overline{HoMarginPBGT}).$$

8. The method according to claim 7, characterized in that the averaged offset term X is calculated by using the equation $$X = \underset{adj}{Average}\left[\left(\frac{Incom + Outg.HOTraffic_{adj \leftrightarrow serv}}{\sum_{adj} Incom + Outg.HOTraffic_{adj \leftrightarrow serv}}\right) \cdot AdjPriorDifference_{adj}\right],$$

wherein Incom+Outg.HOTraffic$_{adj \leftrightarrows cell}$ reflects the sum of incoming and outgoing handovers between adjacent and serving cells.

9. The method according to claim 1, characterized in that in connection mode the additional offset term is created by averaging terms for both directions between a cell of a currently serving base station and a cell of an adjacent base station.

10. The method according to claim 1, wherein in connection mode for prioritizing a plurality of base stations a corresponding plurality of individual additional offset terms are provided; characterized in that the offset terms are averaged so as to create an averaged offset term.

11. The method according to claim 10,
wherein in idle mode a basis C2 cell reselection is calculated by using the equation $$C2_{serv}=(RxLev_{serv}-RxLevAccesMin_{serv})+CellReselectOffset_{serv},$$

where RxLev$_{serv}$ is the received downlink level from the currently serving base station,
RxLevAccessMin$_{serv}$ is the minimum downlink level threshold received by the mobile device to camp in, a cell, and CellReselectOffset$_{serv}$ is the biasing term to artificially change the priority of the currently serving base station; characterized in that, if the averaged offset term is positive, it is taken as the parameter CellReselectOffset$_{serv}$.

12. A system, comprising:
an idle mode unit configured to compare field strength levels of different base stations with each other in order to set up a power budget and to select the most appropriate base station for a mobile device in accordance with said power budget, wherein for prioritizing a predetermined base station an individual additional offset term is applied in the power budget, the system being used for harmonizing an operational area for a mobile device on a cell-by-cell-basis in a cellular radio network; and
a connection mode unit configured to compare the power received from different base stations with each other in order to set up a power budget, and to select the most appropriate base station for the mobile device in accordance with said power budget, wherein for prioritizing a predetermined base station an individual additional offset term is applied in the power budget,
wherein both offset terms are set so as to be similar to each other or the same.

13. The system according to claim 12, wherein idle mode parameters relate to the size of cells of adjacent base stations.

14. The system according to claim 13, wherein the idle mode parameters affect to the size of cells of adjacent base stations in a non-directional way.

15. The system according to claim 12, wherein connection mode parameters take into account differences between cells of adjacent base stations.

16. The system according to claim 12, wherein said offset terms are biasing margin terms.

17. The system according to claim 16,
wherein the power budget PBGT$_{serv}$(adj) is calculated by using the equation $$PBGT_{serv}(adj) = RxLev_{adj} - RxLev_{serv} - HoMarginPBGT_{serv}(adj),$$

where RxLev$_{adj}$ is the received downlink level from an adjacent base station,
RxLev$_{serv}$ is the received downlink level from the currently serving base station, and
HoMarginPBGT$_{serv}$(adj) is a handover margin power budget parameter to artificially change priority of the adjacent base station for handover from the serving base station;
characterized in that
said averaging means averages
the handover margin power budget parameter by using the equation $$\overline{HoMarginPBGT}_{adj}[dB] = \frac{HoMarginPBHGT_{serv}(adj) + HoMarginPBGT_{adj}(serv)}{2}$$

where HoMarginPBGT$_{adj}$(serv) is a handover margin power budget parameter to artificially change priority of the currently serving base station.

18. The system according to claim 17,
characterized by means for calculating the priority difference Adj PriorDifference$_{adj}$ between the cell of the currently serving base station and the cell of an adjacent base station by using the equation $$AdjPriorDifference_{adj}[dB] = \\ (HoMarginPBGT_{serv}(adj) - \overline{HoMarginPBGT}) = \\ (HoMarginPBGT_{adj}(serv) - \overline{HoMarginPBGT}).$$

19. The system according to claim 18,
characterized in that said averaging means calculates the averaged offset term X by using the equation $$X = \\ \underset{adj}{Average}\left[\left(\frac{Incom + Outg.HOTraffic_{adj \leftrightarrow serv}}{\sum_{adj} Incom + Outg.HOTraffic_{adj \leftrightarrow serv}}\right) \cdot AdjPriorDifference_{adj}\right],$$

wherein Incom+Outg.HOTraffic$_{adj \leftrightarrow cell}$ reflects the sum of incoming and outgoing
handovers between adjacent and serving cells.

20. The system according to claim 12, characterized by an averaging unit for averaging terms for both directions between a cell of a currently serving base station and a cell of an adjacent base station in the connection mode.

21. The system according to claim 12,
wherein in connection mode for prioritizing a plurality of base stations a corresponding plurality of individual additional offset terms are provided; characterized by averaging means for averaging said offset terms so as to create an averaged offset term.

22. The system according to claim 21,
wherein said idle mode means calculates a basis C2 cell reselection by using the equation $$C2_{serv} = (RxLev_{ser} - RxLevAccesMin_{serv}) + CellReselectOffset_{serv},$$

where RxLev$_{serv}$ is the received downlink level from the currently serving base station,
RxLevAccesMin$_{serv}$ is the minimum downlink level threshold received by the mobile device to camp in a cell, and
CellReselectOffset$_{serv}$, is the biasing term to artificially change the priority of the currently serving base station; characterized by means for taking the averaged offset term as the parameter CellReselectOffset$_{serv}$ if the averaged offset term is positive.

23. An apparatus, comprising:
idle mode means for comparing field strength levels of different base stations with each other in order to set up a power budget and selecting the most appropriate base station for a mobile device in accordance with said power budget, wherein for prioritizing a predetermined base station an individual additional offset term is applied in the power budget; and
connection mode means for comparing the power received from different base stations with each other in order to set up a power budget, and selecting the most appropriate base station for the mobile device in accordance with said power budget, wherein for prioritizing a predetermined base station an individual additional offset term is applied in the power budget,
wherein both offset terms are set so as to be similar to each other or the same.

* * * * *